US006757692B1

(12) United States Patent
Davis et al.

(10) Patent No.: US 6,757,692 B1
(45) Date of Patent: Jun. 29, 2004

(54) SYSTEMS AND METHODS FOR STRUCTURED VOCABULARY SEARCH AND CLASSIFICATION

(75) Inventors: Charles F. Davis, Fairfax Station, VA (US); Kim L. Ong, Centreville, VA (US)

(73) Assignee: Northrop Grumman Corporation, Los Angeles, CA (US)

(*) Notice: Subject to any disclaimer, the term of this patent is extended or adjusted under 35 U.S.C. 154(b) by 497 days.

(21) Appl. No.: 09/591,317

(22) Filed: Jun. 9, 2000

(51) Int. Cl.[7] ............................. G06F 17/00; G06F 7/00
(52) U.S. Cl. .................................................. 707/104.1
(58) Field of Search ........................... 707/104, 5, 531, 707/2, 3, 4, 513, 104.1; 704/9, 1

(56) References Cited

U.S. PATENT DOCUMENTS

| | | | | |
|---|---|---|---|---|
| 5,083,571 A | * | 1/1992 | Prichep | 600/544 |
| 5,251,131 A | * | 10/1993 | Masand et al. | 704/9 |
| 5,297,039 A | * | 3/1994 | Kanaegami et al. | 707/5 |
| 6,078,914 A | * | 6/2000 | Redfern | 707/3 |
| 6,137,911 A | * | 10/2000 | Zhilyaev | 382/225 |
| 6,178,396 B1 | * | 1/2001 | Ushioda | 704/1 |
| 6,182,029 B1 | * | 1/2001 | Friedman | 704/9 |
| 6,185,576 B1 | * | 2/2001 | McIntosh | 707/200 |
| 6,240,410 B1 | * | 5/2001 | Wical | 707/4 |
| 6,389,436 B1 | * | 5/2002 | Chakrabarti et al. | 715/513 |
| 6,460,034 B1 | * | 10/2002 | Wical | 707/5 |
| 6,507,829 B1 | * | 1/2003 | Richards et al. | 706/45 |
| 6,684,221 B1 | * | 1/2004 | Rejndrup | 707/104.1 |

OTHER PUBLICATIONS

Hartmut Dickhaus and Hartmut Heinrich (1996), Classifying Biosignals with Wavelet Networks, pp. 103–111.*

* cited by examiner

Primary Examiner—Safet Metjahic
Assistant Examiner—Merilyn Nguyen
(74) Attorney, Agent, or Firm—Posz & Bethards, PLC

(57) ABSTRACT

Systems and methods for classifying structured vocabulary where an input is received that includes one or more terms. The one or more terms relate to an area of technology. Each one or more terms are identified and extracted from the input. The results of the extraction may be reviewed, and manually modified if appropriate. Each extracted one or more terms are classified where the classification associates a classified term to each extracted one or more terms. Each classified term is related to the area of technology. The results of the classification may be reviewed, and manually modified if appropriate. A result output is generated containing each one or more terms and the associated classified terms.

32 Claims, 10 Drawing Sheets

SYSTEMS AND METHODS FOR STRUCTURED VOCABULARY SEARCH AND CLASSIFICATION

APPENDIX

An Appendix containing a listing of programs in a kernel for performing term matching and term manipulations is attached. The programs are written in the C++ programming language. The Appendix contains material that is subject to copyright protection. The copyright owner has no objection to anyone who requires a copy of the program disclosed therein for purposes of understanding or analyzing the invention, but otherwise reserves all copyright rights whatsoever. This includes making a copy for any other purposes including the loading of a processing device with code in any form or language.

BACKGROUND

1. Field Of The Invention

This invention relates to classification of vocabularies, and more specifically to classification of structured vocabularies in a single workstation or distributed system environment.

2. Discussion Of Background Information

Today there are many areas of science and technology. Each of the many areas of science and technology have their own terms and concepts that relate specifically to that area of science or technology. These terms and concepts define a vocabulary that is related to the specific areas of science and technology. Given a narrative input containing terms and/or vocabulary that may relate to concepts of a particular science or technology, it may be desired to identify what concepts of a particular science or technology relate to the input. To accomplish this the input may be compared with known concepts to attempt to match the terms received in the input with the known concepts. Terms received in the input may in fact be related to or match multiple concepts. Therefore, it may be necessary to then classify the concepts of each term to, therefore, come up with a more refined concept that relates to the input text.

FIG. 1 shows a flow chart of an example process for accomplishing classification of input. As shown in FIG. 1 an input may be received containing multiple terms related to a particular area of science or technology S1. The input is compared with known concepts to extract the particular terms that relate to concepts of the particular area of science or technology S2. These terms are then classified into a specific concept based on comparing the terms further with known concepts S3. An output is created where the terms that have been extracted in S2 have been classified to a particular concept related to the area of science or technology S4. This process may be automatically done by a processing device where the processing device receives an input, performs steps S1 through S4, and provides an output automatically with minimal user intervention. However, due to the complexity of many scientific and technology terms and phrases, the results of the extraction, and the classification, may need to be reviewed by a user to allow for further refinement of the results of those stages.

Currently, this type of processing is only performed using standalone single workstations. These workstations are operated by a single user, and receive the input, perform the extraction and classification, and produce the output. Generally these workstations may contain a thesaurus containing concepts and terms related to the specific area of science and technology. The workstation may also contain a knowledge bases which is a repository of abbreviations, fillers, algorithms, (stop words such as "of" and "the"), proximity data (words that are similar in spelling or general concept (e.g. teeth and teething)), suffix data (words suffixes with unique meaning), and/or word synonym data (pairs of words that have equivalent meaning or closely related (e.g. car and automobile)). Finally a synonym database may also be used by the workstation. The synonym database contains word synonyms related to terms. The thesaurus, knowledge base, and synonym database contain information that may be used during extraction and classification to compare against the terms received in the input.

Single workstations that perform extraction and classification processing have several drawbacks. Generally, a single workstation uses a single environment of one thesaurus, one knowledge base, and a limited set of synonyms. Some applications may demand multiple thesauri and versions of thesauri, with a unique knowledge base for each, and a set of synonyms that are tailored to the application. Also, a single workstation can only support a single user, and lacks the capability to support hundreds of users in a multi-tiered organization with intercepting lines of authority and reporting. Single workstations use a single controlled vocabulary for all processing, and lacks the capability to be expanded to include generalized areas (domains, i.e., a generalization of multiple concepts) that tier down to specific items (studies or work packages). Current systems are not compatible with legacy systems. Current systems do not allow customer control of assignment and use of approved term synonym lists.

Moreover, current systems do not remove duplicate terms within an input before extraction and classification. Current systems have no management and maintenance tools that allow for the establishment of domains, the establishment of work packages within domains, the assignment of processing environments to work packages, and the assignment of personnel to domains and work packages. Current systems do not allow the loading of multiple thesauri, the maintenance of thesauri, the establishing and maintaining of multiple tiers of term synonym tables, or the ability to associate term synonyms at the enterprise, domain, and work package levels. Current systems do not assign user roles nor prevent any user from doing any work on the system. Further, current systems use a single knowledge base, and do not support copying and associating knowledge bases with various thesauri.

SUMMARY OF THE INVENTION

The present invention may be directed to a method for classifying structured vocabulary that includes: receiving input including one or more terms, where the terms are related to an area of technology; extracting every term from the input; reviewing results from the extracting and manually modifying the extracted terms if appropriate; classifying each extracted term, where the classification associates a classified term to each extracted term, and where each classified term is related to the area of technology; reviewing results from the classifying and manually modifying the classification results if appropriate; and generating a result output containing each term and the associated classified term.

The present invention may also be directed to a method for classifying structured vocabulary that includes: receiving input including one or more terms, where the terms are related to an area of technology; classifying each term, where the classification associates a classified term to each term, and where each classified term is related to the area of technology; reviewing results from the classifying and manually modifying the classification results if appropriate; and generating a result output containing each term and the associated classified term.

The extracted terms may be filtered where the filtering removes duplicate extracted terms producing one or more one unique terms, and the classification is performed on the one or more unique terms. The input may be categorized into one of one or more work packages where the one work package is part of a domain, and each domain includes one or more work packages.

Further, the present invention may be directed to a system for classifying structured vocabulary that includes: one or more networks; one or more client computing devices that are operatively connected to the one or more networks; one or more databases that are operatively connected to the one or more networks; and one or more servers that are operatively connected to the one or more networks, where the servers receive input from the clients, and the input includes one or more terms related to an area of technology and causes the servers to perform: extracting every term from the input; reviewing results from the extracting and manually modifying the extracted terms if appropriate; classifying each extracted term, where the classification associates a classified term to each extracted term, and where each classified term is related to the area of technology; reviewing results from the classifying and manually modifying the classification results if appropriate; and generating a result output containing each term and the associated classified term.

Moreover, the present invention may be directed to a system for classifying structured vocabulary that includes: a workstation; and one or more databases that are operatively connected to the workstation, where the workstation receives input that includes one or more terms related to an area of technology, and the input causes the workstation to perform: extracting every term from the input; reviewing results from the extracting and manually modifying the extracted terms if appropriate; classifying each extracted term, where the classification associates a classified term to each extracted term, and where each classified term is related to the area of technology; reviewing results from the classifying and manually modifying the classification results if appropriate; and generating a result output containing term and the associated classified term.

Additionally, the present invention may be directed to an article comprising a storage medium having instructions stored therein, when executed causes a computing device to perform: receiving input comprising one or more terms, where the terms are related to an area of technology; extracting every term from the input; reviewing results from the extracting and manually modifying the extracted terms if appropriate; classifying each extracted term, where the classification associates a classified term to each extracted term, and where each classified term is related to the area of technology; reviewing results from the classifying and manually modifying the classification results if appropriate; and generating a result output containing each term and the associated classified term.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 9 is an example screen display of what may be presented to a text extractor or reviewer when browsing a synonym database according to an example embodiment of the present invention;

FIG. 10 is an example screen display of the information that may be presented to a classifier for reviewing verbatims according to an example embodiment of the present invention; and FIG. 11 is an example screen display of verbatim processing statistics according to an example embodiment of the present invention.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
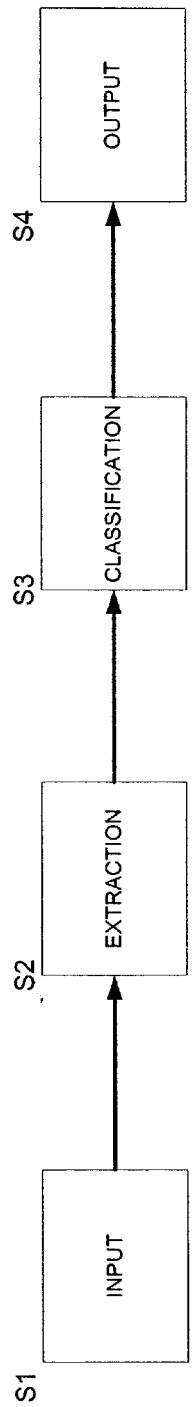
FIG. 1 is a flow chart of an example process for accomplishing classification of input.
Figure 2:
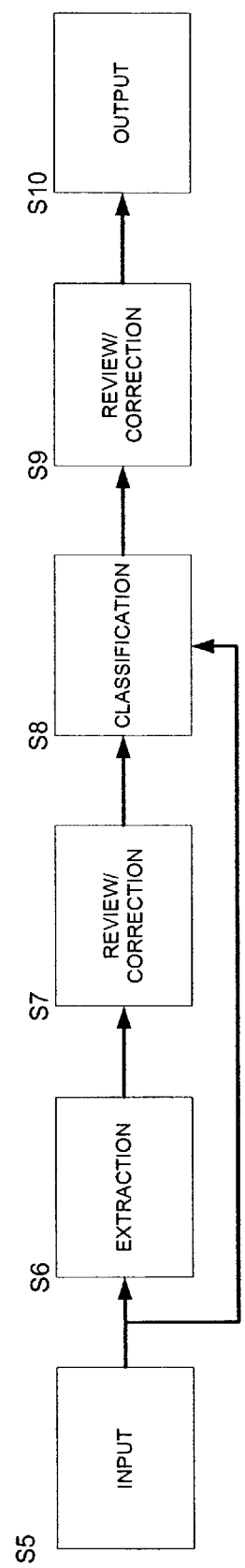
FIG. 2 is a flow chart of an example process for extracting and classifying terms according to an example embodiment of the present invention.

FIG. 2 shows a flow chart of an example process for extracting and classifying terms according to an example embodiment of the present invention. As shown in FIG. 2, input containing terms related to a particular area of science or technology is received S5. The input may be in any of many forms, for example, hardcopy (e.g., paper, facsimile), electronic (e.g., computer file, email, floppy disk), or audio. The input may be put into an electronic form before further processing. This may include a person manually entering the input or an electronic conversion process or device (e.g., an audio to electronic text processor) that converts the input data.

An automated extraction process occurs where the input data may be compared with known concepts of the area of science or technology to identify terms in the input that match or are closely related to matches of any of the concepts. The matching terms in the input data are extracted S6. These extracted terms may be referred to as verbatim terms. At this point, the extraction resultant identified verbatim terms may be displayed on a screen and reviewed, and any appropriate corrections made S7. An automated classification process occurs where the extraction results may be then further compared with terms and concepts in the particular science/technology area to associate a concept to each of the verbatim terms S8. As shown in FIG. 2, if the input already consists of verbatim terms, then the extraction processing may be bypassed, and the classification processing performed directly on the input data S8. The classification results may be displayed on a screen and reviewed, and modifications made to the results to correct or further refine the classification S9. The final results may produce an output of each verbatim term and an associated concept S10 that is related to the particular science/technology area.

In systems and methods for structured vocabulary search and classification according to the present invention, extraction and/or classification may occur on a single workstation or may be executed in a client/server distributed system configuration. The client server configuration supports a multi-national operation with clients accessing one or more servers over networks (e.g., Wide Area Network (WAN), Local Area Network (LAN), Internet, etc.). In a single workstation environment, the workstation may act as both client and server. A client device may contain a Graphical User Interface (GUI) and provide the human/machine interface for the system. A server may contain system components that provide data management, environment management, algorithm processing, auditing, and/or access control functions. Data repositories may reside on a server or may be contained within a customer supplied database management system. The present invention allows for use with a variety of operating systems, for example, a UNIX or Windows NT operating system may run on a server device, and a Windows 95/98/00 or Windows NT operating system may run on a client device.

Figure 3:
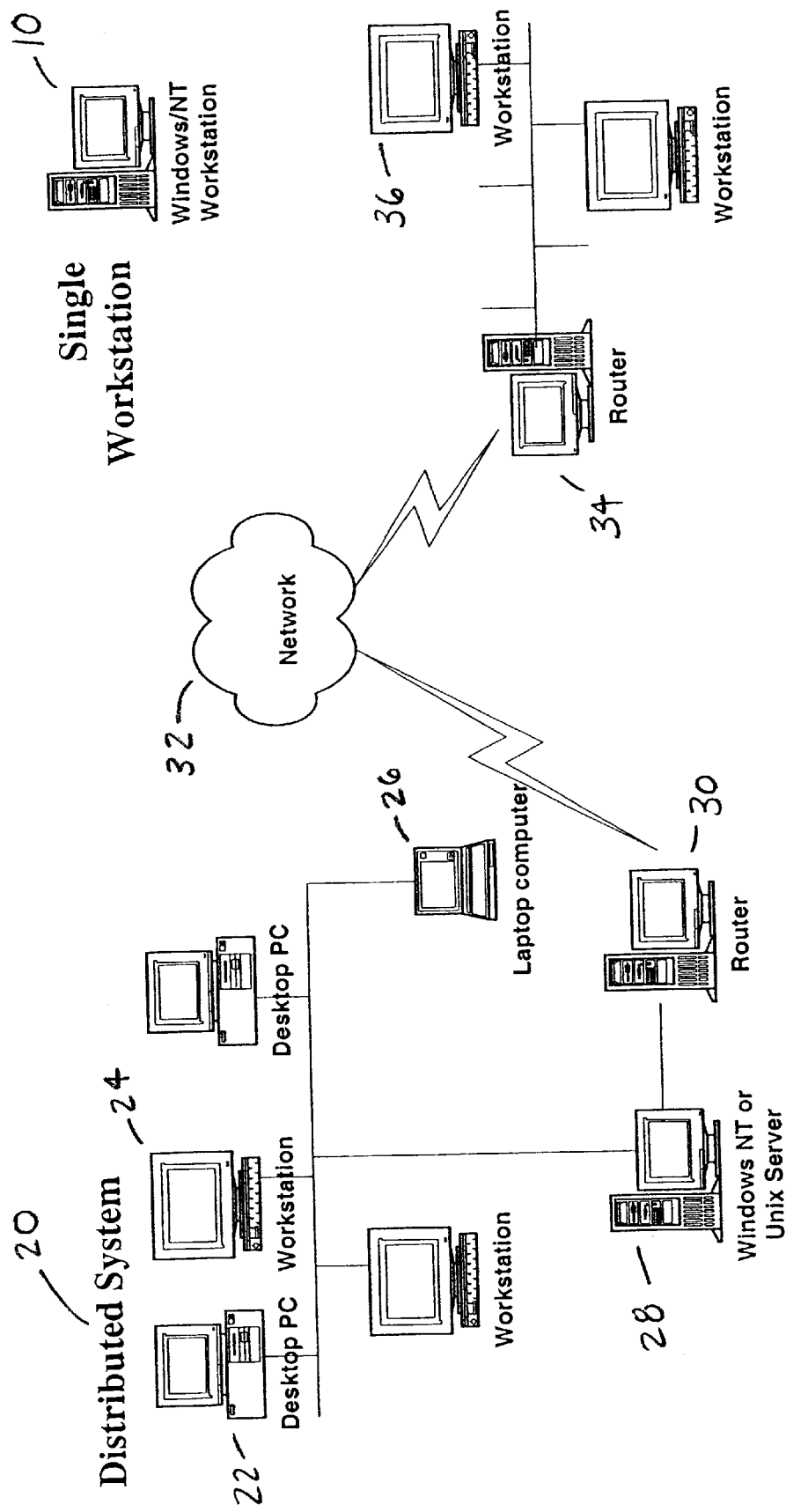
FIG. 3 is a block diagram of an example system for structured vocabulary extraction and classification according to an example embodiment of the present invention.

FIG. 3 shows a diagram of example systems for structured vocabulary search and classification according to an example embodiment of the present invention. As shown in FIG. 3, the present invention may be performed using a single workstation embodiment 10, or a distributed system embodiment 20. Distributed system 20 may comprise one or more networks. Multiple networks may be interconnected via a central network 32. Central network 32 may be a Local Area Network (LAN), Wireless Local Area Network (WLAN), Internet, etc. Network 32 may allow connection between one or more local area networks which may contain one or more desktop personal computers 22, workstations 24, laptop computers 26, and/or servers 28. The servers may be connected to network 32 via a router 30. Network 32 may connect this particular local area network to a second local area network that may also contain a router 34, and one or more workstations 36.

In systems and methods for structured vocabulary search and classification according to the present invention, input data may be received from fixed format ASCII files or structured database tables. The input data may be formatted into work tables where terms contained in the input data may be compared against previously input terms and against one or more customer term synonym list(s). Terms in the input data that are identifiable with a known or similar term related to a specific area of science or technology may be defined as a verbatim term. The present invention may perform comparison processing on input data to identify verbatim terms. This is the extraction process referred to previously. After extraction, duplicate verbatim terms may be identified and eliminated to minimize unnecessary processing of duplicate verbatim terms. The verbatim terms may be compared against known or desired terms and concepts related to this specific science or technology area and then are classified by associating each verbatim term with a specific concept of the area of science/technology.

Matching algorithms may be used to perform the extraction and classification processes. These matching algorithms may use information from one or more thesauri, knowledge bases, and synonym databases to compare against the verbatim terms. The data in the thesauri knowledge bases and synonym databases provide targets for the matching algorithms which make use of lexical characteristics of the English language augmented with knowledge of the specific area of science or technology. The algorithms may use abbreviations, synonymous words, fillers, foreign English spelling variances, suffixes, words that share the same stem, and/or words that are proximate during the matching process. Further, input data string manipulations and more sophisticated lexical processing may also be applied to identify matches. Systems and methods for structured vocabulary search and classification according to the present invention supports review of the extraction and/or classification results, browsing of the information contained in the thesauri, and customizing of the words in synonym databases. The present invention further allows manual classification of verbatim terms that may not have been classified during the automated classification process.

Systems and methods for structured vocabulary search and classification according to the present invention allow for a structure for extraction and classification of a structured vocabulary that allows easy management and maintenance of the system. Companies, customers, organizations, or groups that have or use such a system may be referred to as an enterprise. The present invention may be applied to a variety of applications and embodiments. One particular embodiment will be used to help illustrate the present invention. However, the present invention is not limited to this embodiment. The present invention will be illustrated in part using an example embodiment where the enterprise is a drug company or pharmaceutical company.

In this embodiment, the enterprise may have a desire to track or record adverse reactions to a particular drug or medical treatment. A medical study, trial, or evaluation may have been set up to particularly target adverse reactions to the particular drug. The study, trial, or product evaluation may be defined to occur over a set amount of time, or may be unlimited in duration. Further, the enterprise may simply desire to track adverse reactions to the particular drug from all sources including doctor reports that describe adverse reactions to the drug from their patients. Therefore, verbatim terms ("verbatims") may exist for these studies, evaluations, doctor reports, etc. that relate to medical concepts such as, for example, drugs, medical conditions, medical symptoms, adverse reactions, etc. To help illustrate the present invention, the term "work package" may be used to represent the way work is organized to accomplish the processing of information for a study, product evaluation, trial, etc. Therefore, the input data, in this particular example embodiment, may contain verbatim terms that relate to medical concepts. The present invention may perform extraction of these verbatims and classification of them based on matches made with the medical concepts contained in the thesauri, knowledge bases, and/or synonym databases. The thesauri, knowledge bases, and/or synonym databases may be work package specific or may be of a more general nature.

It is preferred the knowledge databases be tailored to a particular thesaurus because the knowledge base information uses the internal structure (multiple levels) of the thesaurus. The thesaurus does not need to be tailored to anything. Generally, commercial off the shelf thesauri, that are available in a variety areas of science and technology, may be selected and used for processing in a work package. The synonym tables, may contain synonyms that are specified by the customer or enterprise. The knowledge base information may also be modified by the customer. There may be multiple knowledge base databases per thesaurus but it is preferred that one thesaurus, and one knowledge base that is related to the thesaurus be assigned and used for processing of information related to a particular work package. Processing in a work package may use one or more synonym databases.

Moreover, the enterprise may desire to track and process information related to multiple work packages. Related work packages may be organized into larger groups or "domains". The enterprise may set up a processing structure for the system that contains one or more domains. Each domain may consist of one or more work packages. As noted previously, a work package may define how work is organized to accomplish a product evaluation, study, or trial for a particular drug. A domain consists of multiple work packages, and may be related to a particular therapeutic area, or product line, of similar types of work packages (e.g. drugs in a similar area). For example, a work package may be a product evaluation of a particular aspirin product. Therefore, within this work package, reports may be received from doctors and/or other sources regarding any adverse reactions to this particular aspirin product. The domain for this work package may define an area such as analgesics. Therefore, this domain may then include other work packages for other analgesic drugs (e.g., ibuprofen, acetaminophen, etc.). In systems and methods for structured vocabulary search and classification according to the present invention, the enterprise may set up one or more domains and one or more work packages.

Figure 4:
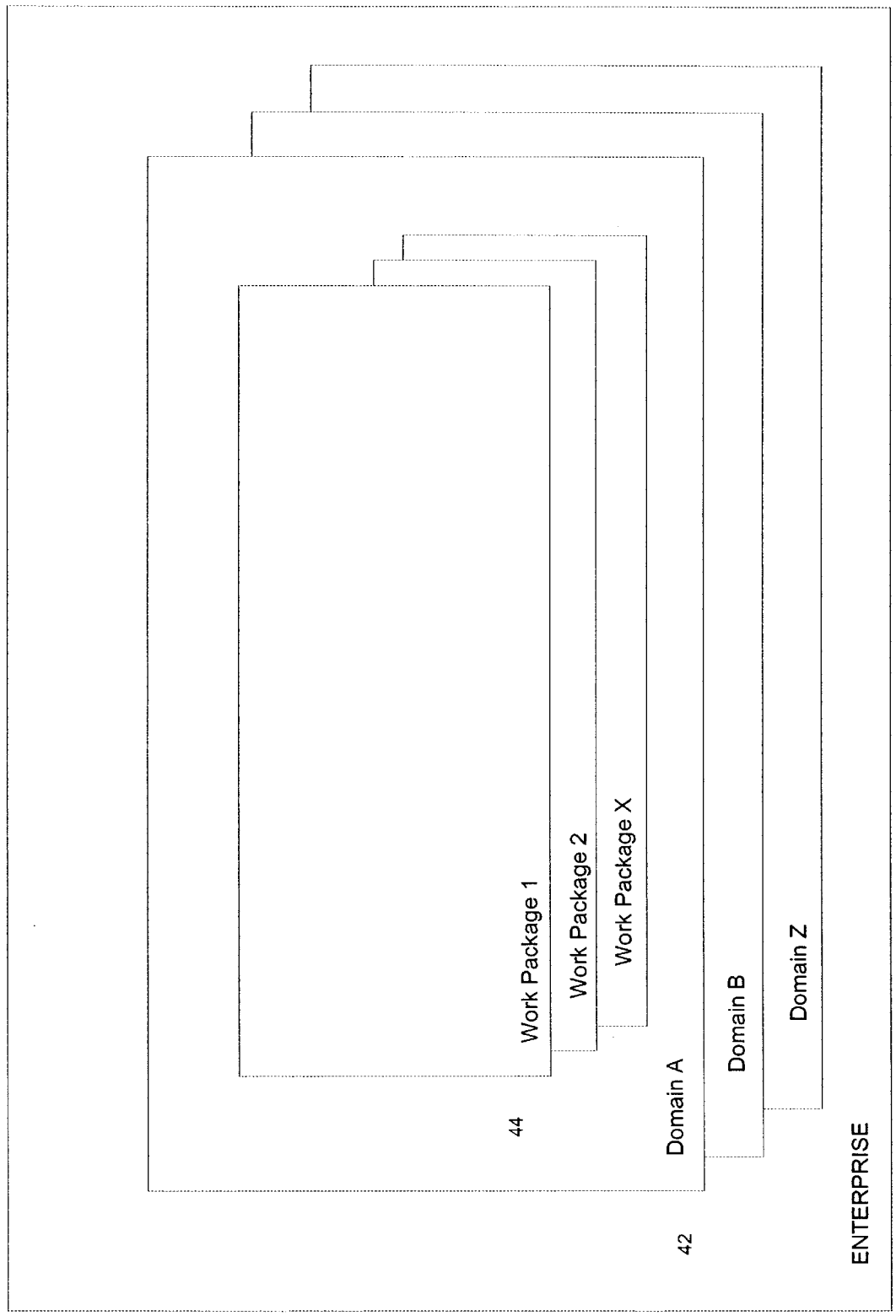
FIG. 4 is a diagram of an example structure for systems and methods for structured vocabulary search and classification according to the present invention.

FIG. 4 shows a diagram of an example structure for systems and methods for structured vocabulary extraction and classification according to an example embodiment of the present invention. This example embodiment structure includes an enterprise 40 with one or more domains 42. Each domain 42 may consist of one or more work packages 44.

In systems and methods according to the present invention, user roles and responsibilities may be defined to allow for work flow management of the extraction, classification, and review processes. Each role may have specific privileges assigned. Individuals assigned to particular roles may be assigned based upon the skills and educational levels of the individual. However, a single individual may perform all roles and, therefore, have all associated privileges. The privileges may prevent individuals not assigned to a particular role from being able to perform a task associated with that role. The following are example roles according to systems and methods according to the present invention: director, administrator, work manager, reviewer, text extractor, and classifier.

A director may provide an enterprise with a single point of control for all system wide decisions and controls. The director may control the decision and deletion of users to the system, create domains or therapeutic areas within the system hierarchy, and control the system wide data in use by the system. The system wide data refers to the information in thesauri, dictionaries, enterprise wide synonym tables, and knowledge bases.

An administrator may perform functions associated with a domain. There may be one or more than one administrator assigned to a domain by a director. Further, an administrator may be assigned to multiple domains. An administrator may be responsible for: maintaining the knowledge base for the domain(s) for which he or she is responsible; creating work packages within the domain; assigning users (from a pool of users created by the director) to perform the work on those work packages; establishing and maintaining a domain level term synonym table, if desired; and monitoring the work and reacting to any potential security spoofs of the system.

A work manager may be responsible for the conduct of a work package. There may be one or more work managers assigned to a work package. It is generally within a work package where classification and review activity is conducted. A work manager may have the responsibility to: identify where input data ought to be obtained; identify the type and priority of the input data provided; assign user roles within the work packages to those users assigned by the administrator; resolve any disagreements between reviewers; identify where output data are to be placed; monitor the work in progress; and modify work assignments as needed.

A reviewer may be responsible for reviewing the classification of verbatim terms that have been classified by one or more classifiers (discussed following) on the work package and for the review of those verbatim terms that have been extracted from narrative reports. Systems and methods according to the present invention allow for an administrator for a domain to designate the number of reviewers (e.g., zero, one or two for classification and/or zero or one for text extraction). A reviewer may review each verbatim term. A reviewer may be responsible for looking at each extracted or classified verbatim term to ensure the accuracy of the work, and to correct any problems found. A reviewer also may have the responsibility to do the classification for any verbatim terms that a classifier has deferred. In systems and methods according to the present invention, the reviewer identification may be recorded as part of an audit trail for each term that the reviewer accepts.

A text extractor may be responsible for evaluating the narrative text, extracting the verbatim terms that are present, and assigning a label to each term (e.g. adverse reaction, existing medical condition, drug, etc.). A text extractor may individually examine each sentence within a narrative report. A text extractor may accept the verbatim terms identified automatically and displayed by the system, or may use an interactive extraction review capability within the system, to delete, add or modify terms from the input data. The final list of verbatim terms derived by a text extractor may form a standard work table for the work package. The system may record the text editor's identification as part of an audit trail for each term that the text extractor accepts either from the automated or the manual process.

A classifier may be responsible for evaluating each of the verbatim terms presented within a work table and deriving the best matching and classification terms from either enterprise term synonym tables or the thesaurus in use for the particular work package. A classifier may accept the matching and classification term recommendations from the system, or may use the interactive classifying capability within the system to derive the appropriate term and to fix the relationship between those terms. The system may provide a classifier with a full browse and search capability of both the thesaurus and the term synonym tables, should they exist. The system may also record the classifier's identification as part of an audit trail for each term that the classifier classifies or defers either from the automated or the manual process.

Figure 5:
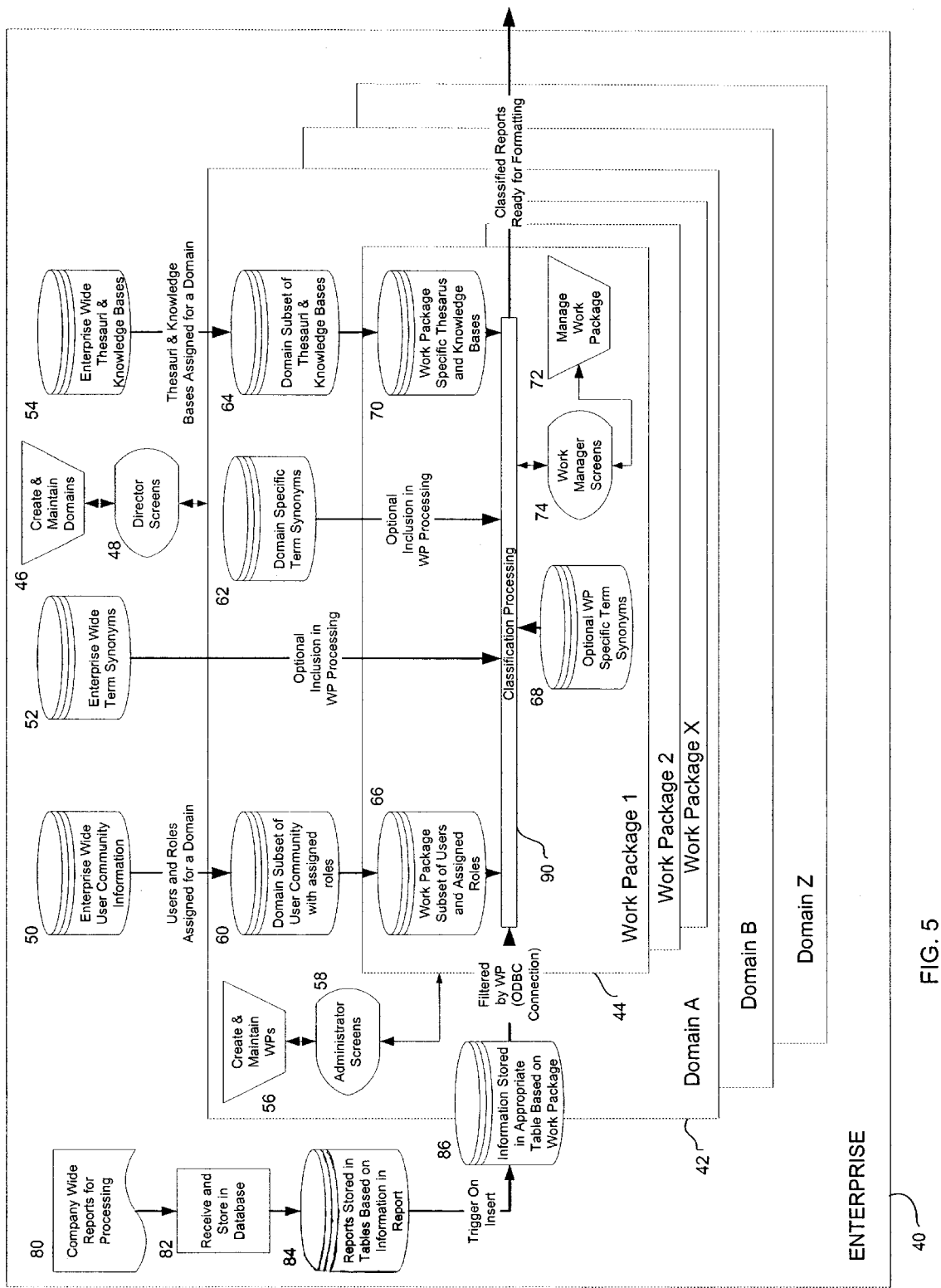
FIG. 5 is a block diagram of details of an example system for structured vocabulary extraction and classification according to an example embodiment of the present invention.

FIG. 5 shows a block diagram of an example system for structured vocabulary search and classification according to an example embodiment of the present invention. The blocks, functions, and activities shown in FIG. 5 are shown with respect to the level they reside or are performed, e.g., at the enterprise, domain, or work package level. The associated processing may be performed at various locations through a distributed system. A director creates and maintains one or more domains 46. The director accomplishes this by sitting at a screen and creating domains and associated assignments 48. This occurs at the enterprise level. The enterprise may also provide databases containing information that may be used during the processing. The enterprise may provide an enterprise wide user community information database 50, an enterprise wide term synonyms database 52, and/or enterprise wide thesauri and knowledge databases 54. Database 50 may contain definitions of users (e.g., names of people) and their assigned roles. Database 52 may contain company wide term synonyms that the company has defined and wants to use in its synonym databases. Similarly, database 54 may contain one or more thesauri and associated knowledge bases that the enterprise desires to be used during the extraction and classification processing.

At the domain level, an administrator creates and maintains work packages 56. The administrator may have a screen display 58 to enable the administrator to create and maintain one or more work packages that are part of the administrator's domain. Each domain also may contain a number of databases specific to the domain. These may include one or more databases which contain a domain specific subset of user community names with their assigned roles 60, one or more databases containing domain specific term synonyms 62, and/or one or more databases containing a domain specific subset of thesauri and knowledge bases 64.

At the work package level, each work package may contain one or more databases containing a work package specific subset of users and assigned roles 66, one or more databases containing work package specific thesaurus and knowledge bases 70, and one or more optional work package specific term synonym databases 68. Further, a work manager assigned to the particular work package may manage the work package 72, at a work manager's screen 74.

The various databases, processing, screens, devices, activities, etc. may reside at any server, workstation, or computing device accessible via a network and/or distributed system. Therefore, although a set of databases may be associated with a particular domain, for example, these databases may be physically located at diverse locations throughout the network. Similarly, as stated previously, there may be multiple administrators, and/or work managers associated with particular domains or work packages. The administrators responsible for one or more domains may be located at diverse locations throughout the network. The work managers associated with one or more work packages may also reside at various locations throughout the network.

Further, the enterprise may desire that the use of terms in a specific database take precedence over terms in other databases. For example, it may be desired that synonyms found in work package specific database 68 and that match a verbatim term take precedence over synonyms that may reside in the domain specific term synonym database 62 and that also may match the verbatim term. Also, domain specific term synonyms found in database 62 may override or take precedence over company wide term synonyms found in company wide database 52 if terms found in both databases 62 and 52 match a verbatim term.

As noted previously, to help illustrate the present invention, an embodiment where the enterprise is a pharmaceutical or drug company may be used. Using this example embodiment, the company may receive reports for processing from several sources such as doctors, hospitals or other medical sources 80. These reports may contain, according to this example embodiment of the present invention, information regarding adverse reactions to a drug or other medical treatment. Therefore, the reports contain the terms to be searched, extracted, and classified. These reports may come in various formats, for example, a paper copy, an electronic copy, a facsimile, an audio clip, etc. The reports are received and stored in a database 82. A person may receive the reports and store them in an appropriate table in a database. Therefore, the reports are stored in tables in database 84 based on the information in the report. Processes in one or more servers periodically check the tables in database 84 to determine if new data has been placed in the tables. When new information is stored in the tables in database 84, a trigger occurs which causes each table to be stored in an appropriate location in database 86. Information is stored in an appropriate table in database 86 based on a work package associated with the report data. Thus, report information that has been filtered by work package is then sent to the classification processing 90 for the appropriate work package. The interface between database 86 and the classification processing 90 may be by an Open Database Connectivity (ODBC) connection.

Figure 6:
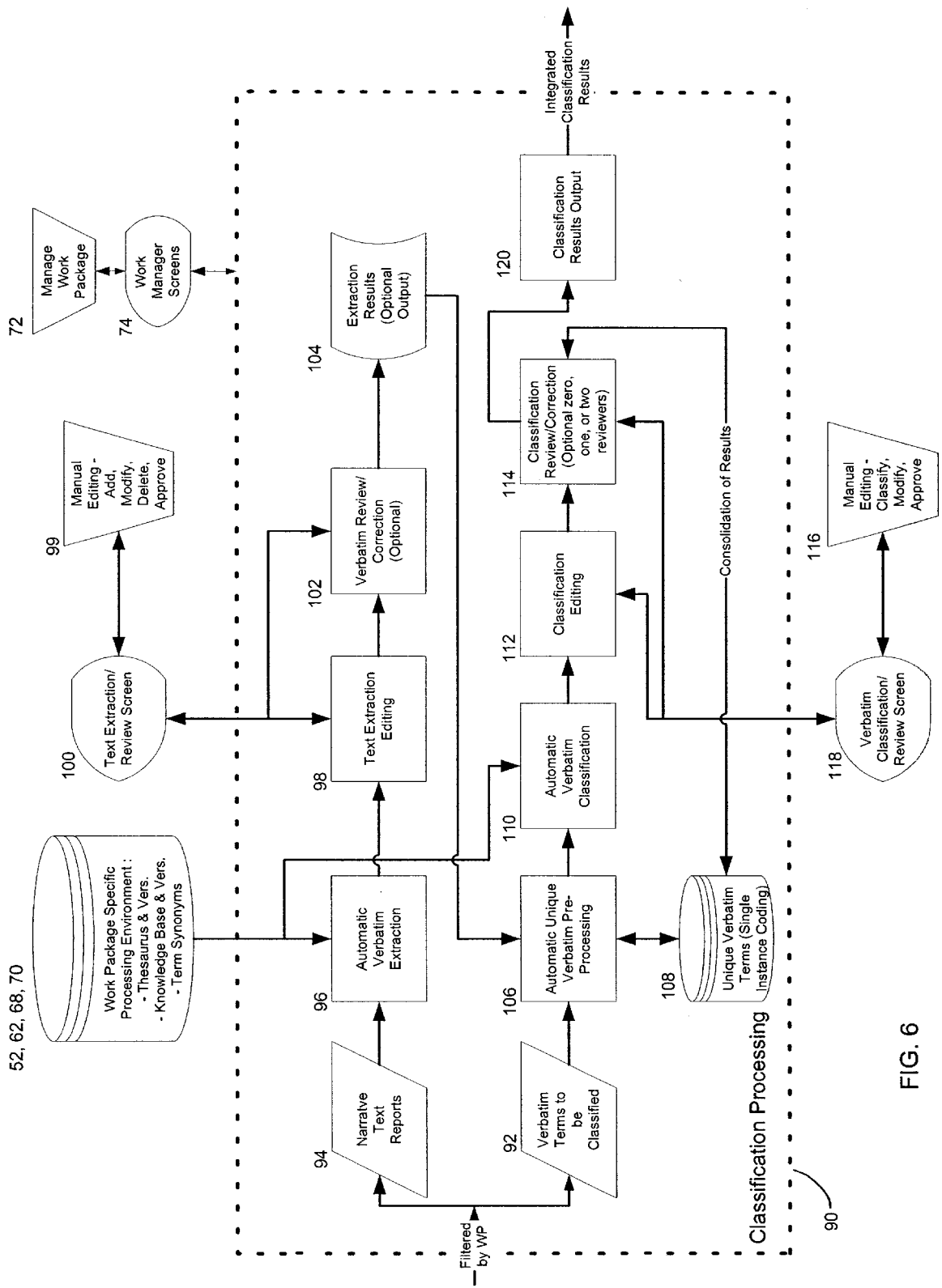
FIG. 6 is a block diagram of example classification processing according to an example embodiment of the present invention.

FIG. 6 shows a block diagram of example classification processing according to an example embodiment of the present invention. One or more work managers may manage the work package 72 by inputting information and receiving information on work manager screen 74. The report information that has been filtered by work package may be sent to classification processing 90 for the specific work package. The reports may contain information in one of two forms. The verbatim terms may already have been extracted, and therefore, the report may consist of verbatim terms that only need to be classified 92. Further, the report may contain narrative text which contains terms that require extraction into verbatims 94. As shown in FIG. 6, if reports contain verbatim terms 92, then the extraction portion of the processing may be by-passed. However, if the verbatims have not been extracted, then the reports may contain narrative text 94 that require extraction of the verbatim terms.

Narrative text reports 94 are sent to the automatic verbatim extraction processing 96. This processing uses extraction algorithms along with information contained in the work package specific thesaurus and knowledge databases 70 and the optional synonym databases 52, 62 and 68 to perform extraction of verbatim terms from the narrative text report. The extraction algorithms may be lexical matching algorithms which match a verbatim string with terms in the databases based on syntactical closeness between the strings. Lexical matching algorithms that may be used to match terms may take into account the history of other verbatim terms found related to this work package, acronyms, abbreviations, synonymous words, fillers, suffixes, and word proximity. In general, terms and words of these types may be found in the knowledge base database(s). The extraction algorithms may treat a verbatim string as a paragraph of text and then identifies all possible verbatim terms in that text, using the lexical matching algorithms. The extraction algorithms may rearrange words, delete words, change suffixes of words, etc. to try to identify verbatim terms Once verbatim terms have been identified, the extraction algorithms may try to minimize these terms by combining them together to further identify a match. Once the extraction process has been completed, the verbatim terms may be stored in a table. This table may include each verbatim, and the portion of a sentence that the verbatim came from in the narrative text report.

Figure 7:
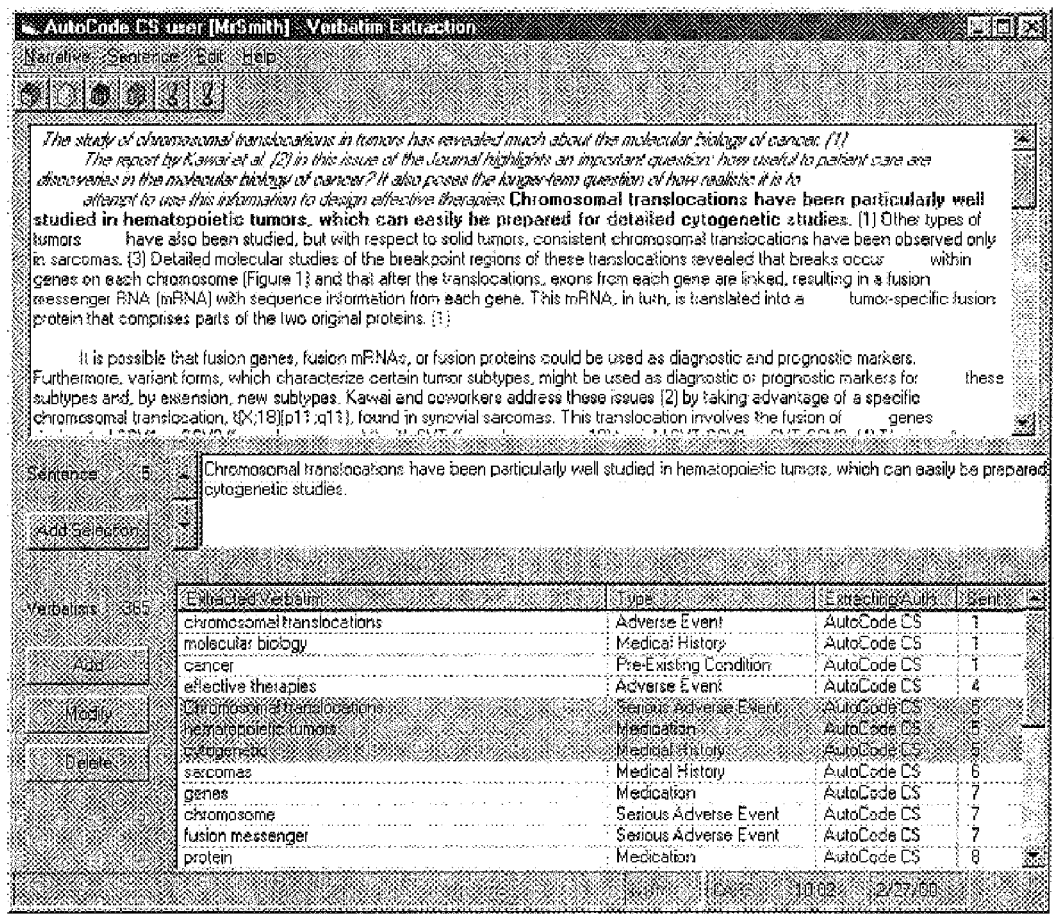
FIG. 7 is an example screen display showing the results of verbatim extraction according to an example embodiment of the present invention.

FIG. 7 shows an example screen display of the results of verbatim extraction according to an example embodiment of the present invention. The sentence that the extracted verbatim term came from is highlighted. In this example embodiment the classification processing system 90 is called "AutoCode CS". The extracted verbatim terms may be listed along with their associated type and other information (e.g., sentence number, extracting authority, etc.). The sentence number may refer to the order of the sentence in the paragraph that the verbatim resides. The extracting authority may refer to whether the verbatim was identified by the system (e.g., AutoCode CS) or was manually entered by a text extractor or reviewer. After completion of verbatim extraction, the processing may place this resultant information in one or more tables. The processing may also place the table(s) in a queue and may await review of the extraction results by a text extractor.

The information on the screen shown in FIG. 7 may be presented to a text extractor who may perform text extraction editing 98. The text extractor may perform manual editing by adding, modifying, deleting or approving 99 the verbatim terms extracted during the verbatim processing. The text extractor uses a text extraction/review screen 100 to perform his or her operations. Since there may be many text extractors working in this particular work package, once the automated text extraction processing is completed, an item (table(s)) may be placed in a queue where any text extractor may retrieve the item (extracted verbatim term information) from the queue and begin his or her editing process. Once a completed verbatim extraction table has been removed from a queue by a text extractor, other text extractors do not have access to that particular table.

Once a text extractor has completed his or her review and editing task, these results may then be further reviewed by a reviewer. There may be one or more reviewers. A reviewer may review the verbatim terms extracted and make additional corrections, if required 102. The reviewer may see the information presented in the same format as that shown in FIG. 7. Both the text extractor and the reviewer of the verbatim terms may have the capability to browse the contents of the thesaurus that has been used, or the synonym table(s) used.

Figure 8:
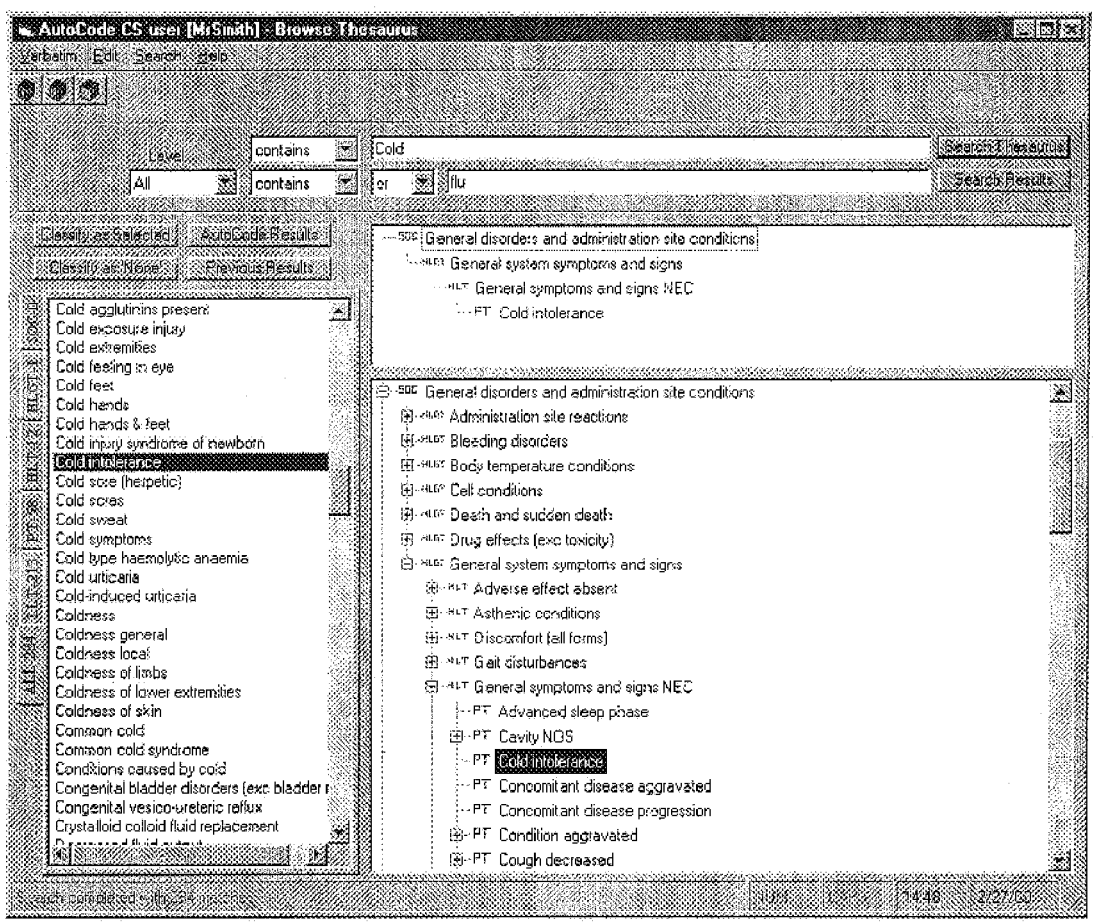
FIG. 8 is an example screen display of what may be presented to a text extractor or reviewer when browsing a thesaurus according to an example embodiment of the present invention.

FIG. 8 shows an example display of what may be presented to a text extractor or reviewer when browsing a thesaurus according to an example embodiment of the present invention. The verbatim terms stored in the thesaurus are listed in alphabetical order on the left hand side. On the right hand side they are also listed but are shown as to where they are in the hierarchy of terms stored in the thesaurus. The higher level terms are more general terms, whereas the lower in the hierarchy that the terms are, the more specific the terms may be. Therefore, verbatim terms stored in a thesaurus may have a level associated with them.

Figure 9:
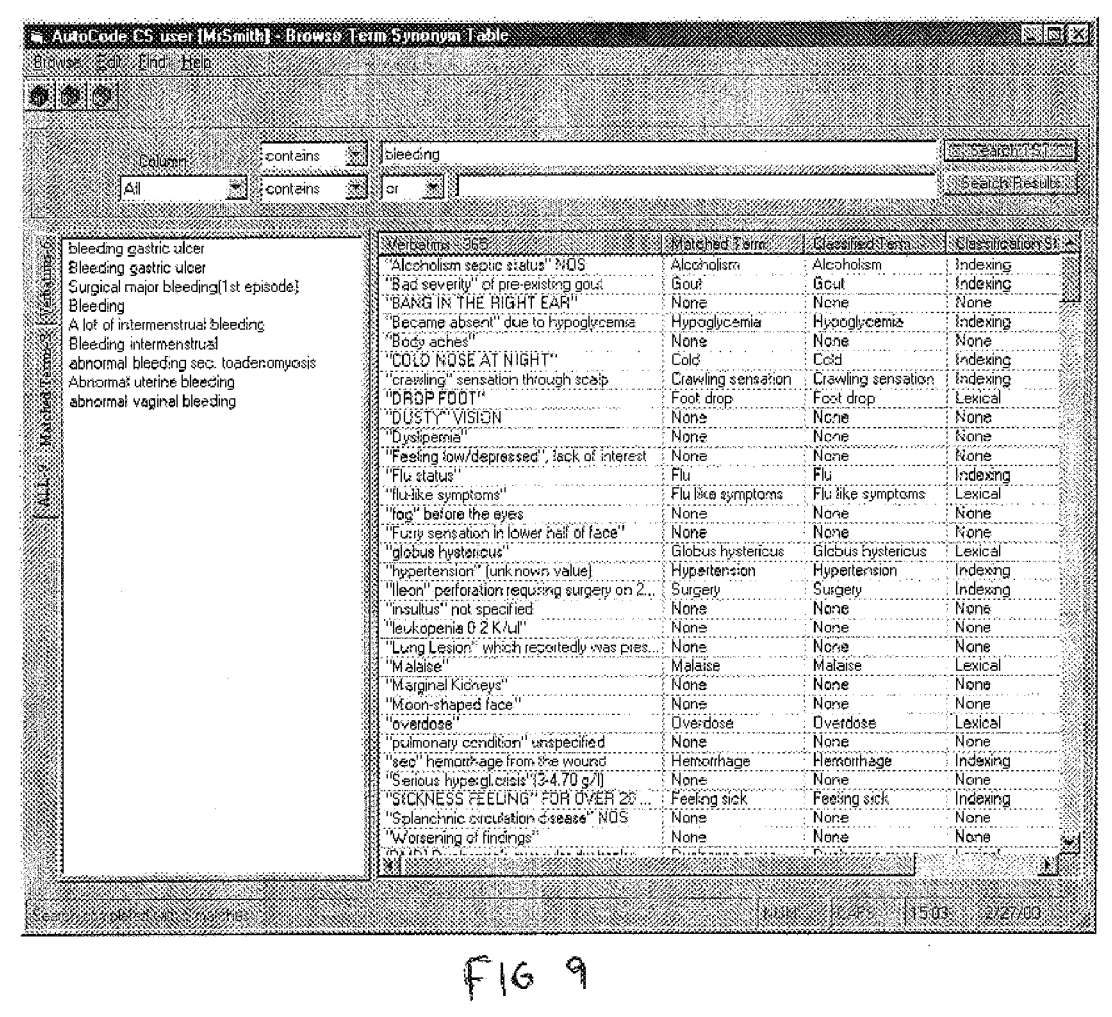

FIG. 9 shows an example display what may be presented to a text extractor or reviewer when browsing a synonym database according to an example embodiment of the present invention. This display shows a list of verbatims identified during the extraction process on the far left side, and the total list of verbatim in the synonym table on the right side, along with other associated information. Unlike the thesaurus where verbatim terms are in a structured tiered format, the synonym table may simply have verbatim terms and other associated information where there is no level associated with the verbatim terms. The text extractor or the reviewer may review information in the thesaurus and synonym table(s) and make modifications to the results of the verbatim extraction by selecting different verbatim terms that they have identified by browsing the thesaurus or synonym table(s).

The level associated with the verbatim terms in the thesaurus may be used to determine a ranking or "goodness/quality of fit" for the particular verbatim match. For example, if a verbatim term in the thesaurus has been matched to a term in the narrative text report, where the matching verbatim term is at a higher level, this may denote a lower ranking or quality of fit (since a higher level is more generalized). However, if the extraction algorithms have had to go deeper into the list of tiered verbatim terms to identify a match, this may be deemed to be a higher quality of fit.

Moreover, the amount of manipulations that the processing algorithms need to perform to identify a verbatim may affect the goodness of fit for that particular verbatim. For example, if the processing algorithms perform several character and/or ending manipulations before identifying a matching verbatim, the ranking/goodness of fit may be low.

Referring back to FIG. 6, once the reviewer has approved the extracted verbatim, the extraction results, are completed 104. The extraction results 104 may include the verbatim terms, and an associated type. The type to be associated with a particular verbatim term may be defined by the customer. These results may be sent elsewhere or may proceed through further processing in the classification processing 90.

Extraction results 104 (or verbatim terms 92) may then be sent to automatic unique verbatim pre-processing 106. Unique verbatim pre-processing may identify duplicate extracted verbatims, as well as extracted verbatims that have previously been classified already. The unique verbatim pre-processing 106 may use one or more databases 108 which may contain verbatim terms that have already been previously classified and processed in this work package.

This simplifies the processing and prevents unneeded processing of verbatim terms that have already been processed.

The unique verbatim term may be a non-case sensitive direct match. Database 108 may contain tables which are empty when a work package is initially created. Once processing begins on verbatim terms, a verbatim term table in database 108 is filled with the first instance of each verbatim term found during processing in the work package. Verbatim pre-processing 106 gets rid of duplicate verbatim terms and outputs unique verbatim terms.

The unique verbatim terms may then be sent to be processed by automatic verbatim classification processing 110. This processing may initially eliminate verbatim terms that are of types that are not desired to be classified by the customer or enterprise. This may be accomplished by comparing the extracted verbatim terms and their associated types with a table of types that are desired to be classified for the particular work package. Only verbatim terms that have a type that matches the desired types may be sent to the classification processing algorithms. The verbatim classification processing may use the same types of algorithms used during the extraction processing to compare the extracted verbatims with information stored in the thesaurus, knowledge base, and term synonym database(s) to identify a matched term.

Each matched term may have an associated classified term. Generally, a matched term may reside at a lower level in the thesaurus hierarchy than a classified term. The classification algorithms may primarily perform lexical manipulation on characters of words to identify matches. This is in contrast to the manipulation of words within a sentence as may be primarily performed in the extraction algorithms. When a match is found, the classification term is what may be reported out as a result of the classification processing. If multiple matches are found, the rankings of all potential matches (i.e. goodness of fit) may be identified. As noted previously, this ranking may identify how well the classification algorithm thinks it matched the term to the verbatim. The more manipulations (changing characters around, endings, etc.), the lower the ranking.

Once the verbatim classification processing 110 has been completed, the results may be placed in a queue to await review by a classifier. The may be one or more classifiers. The verbatim classification processing 110 may produce output containing: the verbatim terms, type, ranking, matched term, the classification, an ID, and the classifying authority (e.g., AutoCode CS, classifier, reviewer, etc.). This information may be retrieved by a classifier who may begin classification editing 112. A classifier may retrieve the information from the queue and begin manual editing by classifying, modifying or approving the results of automatic verbatim classification 116. There may be more than one classifier working on information related to this particular word package. Therefore, the first one to retrieve the information from the queue may prevent others from duplicating the effort of that particular classifier. A classifier may review the resultant verbatim classification information on a review screen 118.

Figure 10:
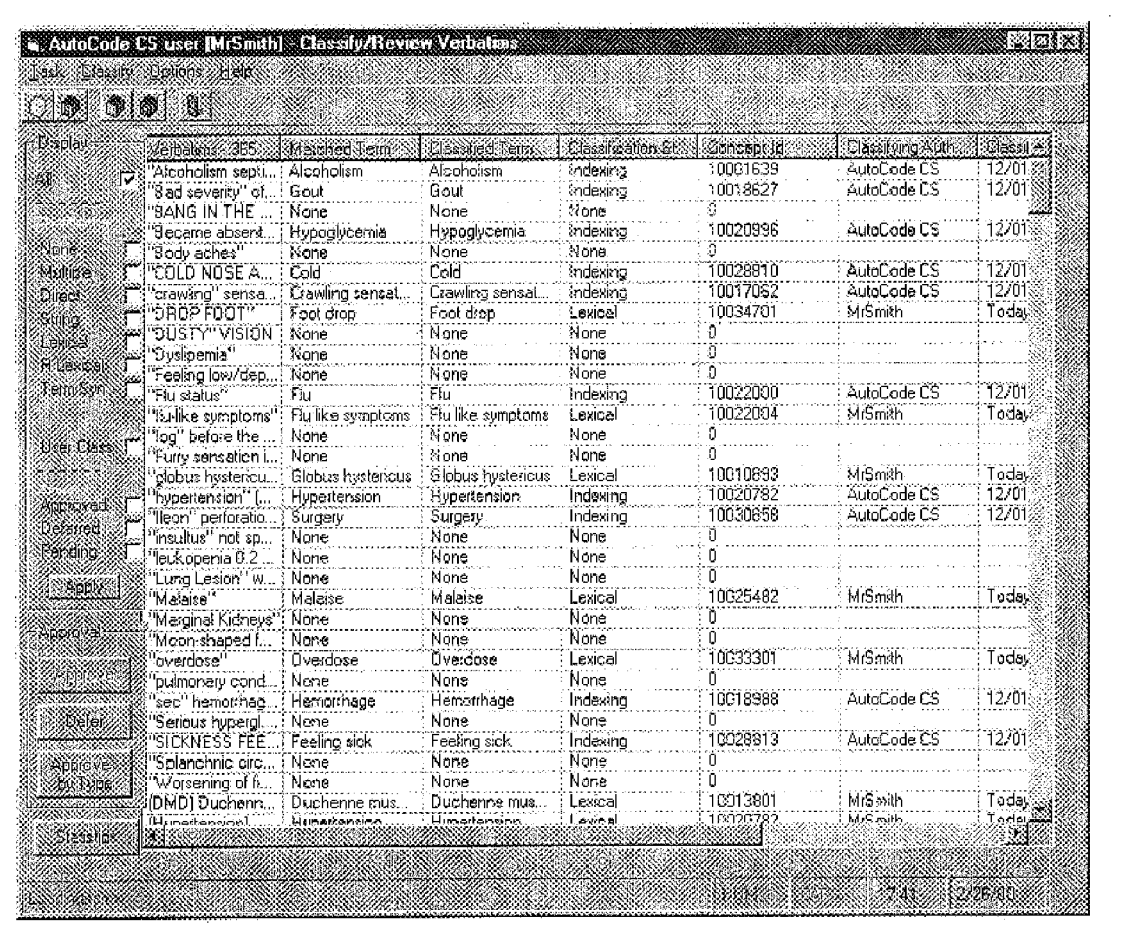

FIG. 10 shows an example screen display of the information that may be presented to a classifier for reviewing verbatims according to an example embodiment of the present invention. The information displayed may include: the verbatims, matched terms, classified terms, classification status, ID, classifying authority, and other information. The classifier may modify this information, or approve the information and forward it on for further processing. Therefore, the classifier performs classification review and correction 114. There may be more than one reviewer. The results of one reviewer may be reviewed by a second reviewer, whose results may then be reviewed by another reviewer. Once the review process has been completed, the classification results are outputted 120. Thus, classification processing 90 has been completed. The classification results 120 may be put into a format to be stored back into tables in the customer's database 84.

Figure 11:
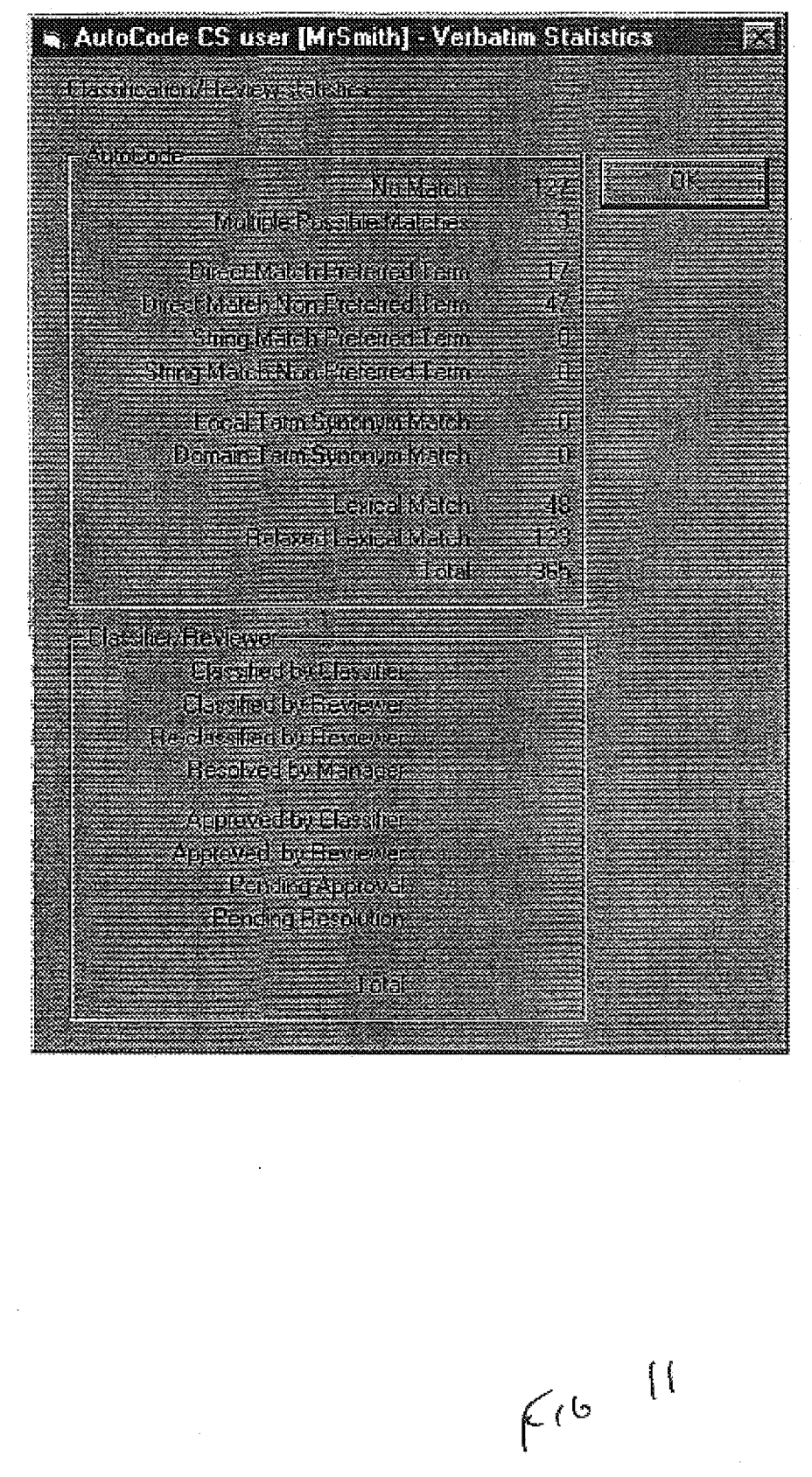

FIG. 11 shows an example screen display of verbatim processing statistics according to an example embodiment of the present invention. This information may be pulled up and available to a reviewer who desires to identify how well the extraction and classification processing is being performed.

In systems and methods for structured vocabulary search and classification according to the present invention the various processing and functions may occur in the same computing device (client, server, workstation, etc.), or, in a distributed system embodiment, the processing may be distributed and portions may occur in different computing devices. Further, algorithms and processing instructions that perform all or portions of the present invention may be stored on a computer readable medium. This allows easy portability of the present invention.

Systems and methods for structured vocabulary search and classification according to the present invention provide several advantages. The present invention allows for multiple environments of multiple thesauri, knowledge bases, and synonym databases. The present invention allows for multiple thesauri and versions of thesauri, with a unique knowledge base for each, and a set of synonyms that are tailored to the application. The present invention allows for support of multiple users, and can support hundreds of users in a multi-tiered organization with intercepting lines of authority and reporting. The present invention allows for the capability to be expanded to include generalized areas (domains, i.e., a generalization of multiple concepts) that tier down to specific items (studies or work packages). The present invention allows for compatibility with legacy systems. The present invention allows for customer control of assignment and use of approved term synonym lists.

Moreover, the present invention allows for removal of duplicate terms within an input before extraction and classification. The present invention allows for management and maintenance tools that allow for the establishment of domains, the establishment of work packages within domains, the assignment of processing environments to work packages, and the assignment of personnel to domains and work packages. The present invention allows for the loading of multiple thesauri, the maintenance of thesauri, the establishing and maintaining of multiple tiers of term synonym tables, and the ability to associate term synonyms at the enterprise, domain, and work package levels. The present invention allows for assignment of user roles and prevention of any user from doing any work on the system. Further, The present invention allows for multiple knowledge bases, and supports copying and associating knowledge bases with various thesauri.

The present invention is not limited to any specific application, but covers any application or use that is within the spirit and scope of the present invention. The present invention may be applied to various areas and/or applications. For example, the present invention may be applied to intelligence applications for screening of information that could be classified and routed to analyst for review. The present invention may also be applied to chemical tracking applications for U.S. Environmental Protection Agency and state agencies to track and classify emissions and pesticide pollution in public reports, filings, and public documents. Further, the present invention may be applied to insurance applications for classifying and paying medical claims and for gathering, assimilating, and classifying information for negligence and tort suits. In addition, the present invention may be applied to financial applications for gathering/presenting and classifying information on business conditions at companies. Moreover, the present invention may be applied to legal applications for gathering case law information and classifying the information to address current legal issues. The present invention may also be applied to news wire services applications for gathering, assimilating, and classifying information from multiple news and information sources. The present invention may be applied to military messages applications for reviewing and classifying multiple military messages to determine relevancy and trends. The present invention may be also applied to criminal justice applications for gathering witness and other information and classifying the information for judicial proceedings. Moreover, the present invention may be applied to information searching applications that link with intelligent agents to more effectively find information from web sites using software search engine tools, and classifying the information.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for classifying structured vocabulary comprising:

receiving input comprising at least one term, the at least one term related to an area of technology;

extracting every at least one term from the input to identify verbatim terms;

reviewing results from the extracting and manually modifying the extracted at least one term to eliminate duplicates of the extracted at least one term;

classifying each extracted at least one term, the classification associating one or more classified terms to each extracted at least one term, each of the one or more classified terms being related to the area of technology;

reviewing results from the classifying and manually modifying the classification results to eliminate one or more of the one or more classified terms; and generating a result output containing each at least one term and the one or more associated classified terms.

2. The method according to claim 1, wherein the area of technology comprises medical.

3. The method according to claim 2, wherein the medical area of technology comprises drugs and adverse reactions to the drugs.

4. The method according to claim 1, further comprising filtering the extracted at least one term, the filtering removing the duplicates of the extracted at least one term and producing at least one unique term, the classifying being performed on the at least one unique term.

5. The method according to claim 1, wherein the at least one term comprises a medical term.

6. The method according to claim 5, wherein the medical term comprises a drug.

7. The method according to claim 5, wherein the medical term comprises an adverse reaction to a drug.

8. The method according to claim 1, wherein the input comprises narrative text.

9. The method according to claim 1, the extracting further comprising comparing the at least one term with terms in at least one database.

10. The method according to claim 9, wherein one of the at least one database comprises a thesaurus database, terms in the thesaurus database being related to the area of technology.

11. The method according to claim 10, wherein the terms in the thesaurus database are organized in a multi-tier structure.

12. The method according to claim 9, wherein at least one of the at least one database comprises a synonym database.

13. The method according to claim 9, wherein at least one of the at least one database comprises a knowledge base, terms in the knowledge base being related to the thesaurus database.

14. The method according to claim 13, wherein the terms in the knowledge base comprise at least one of acronyms, abbreviations, fillers, proximity data, suffix data, and synonymous words.

15. The method according to claim 9, wherein the comparing comprises matching each at least one term with the terms in the at least one database based on syntactical closeness, the matching using lexical matching algorithms, the matching manipulating each at least one term within a sentence.

16. The method according to claim 15, further comprising generating a goodness of fit ranking, the goodness of fit ranking being based on an amount of lexical manipulations.

17. The method according to claim 1, further comprising formatting the input into at least one input table before the extracting.

18. The method according to claim 9, further comprising updating the terms in the at least one database based on the result output.

19. The method according to claim 1, further comprising formatting the result output into at least one table.

20. The method according to claim 1, wherein the extracting every at least one term from the input and the classifying each extracted at least one term comprise extracting every at least one term from the input and classifying each extracted at least one term in an automated manner.

21. A system for classifying structured vocabulary comprising:

at least one network;

at least one client computing device, the at least one client computing device operatively connected to the at least one network;

at least one database, the at least one database operatively connected to the at least one network; and at least one server, the at least one server operatively connected to the at least one network, at least one server receiving input from at least one client, the input comprising at least one term related to an area of technology and causing the at least one server to perform:

extracting every at least one term from the input to identify verbatim terms;

allowing review of results from the extracting and manual modification of the extracted at least one term to eliminate duplicates of the extracted at least one term;

classifying each extracted at least one term, the classification associating a classified term to each extracted at least one term, each classified term being related to the area of technology;

allowing review of results from the classifying and manual modification of the classification results; and generating a result output containing each at least one term and the associated classified term.

22. The system according to claim 21, the extraction results review and modification being performed at one of the at least one client.

23. The system according to claim 21, the classification results review and modification being performed at one of the at least one client.

24. An article comprising a storage medium having instructions stored therein, when executed causes a computing device to perform:

receiving input comprising at least one term, the at least one term related to an area of technology;

extracting every at least one term from the input to identify verbatim terms;

reviewing results from the extracting and manually modifying the extracted at least one term to eliminate duplicates of the extracted at least one term;

classifying each extracted at least one term, the classification associating one or more classified terms to each extracted at least one term, each of the one or more classified terms being related to the area of technology;

reviewing results from the classifying and manually modifying the classification results to eliminate one or more of the one or more classified terms; and generating a result output containing each at least one term and the one or more associated classified terms.

25. A system for permitting structured vocabulary searches, the system comprising:

an enterprise having a single point of control for all system wide decisions and controls, wherein the enterprise includes an enterprise level database for receiving textual data that contains terms to be classified;

one or more domains that are each related to a particular scientific or technological area, wherein the one or more domains are provided within the enterprises and each of the one or more domains includes one or more knowledge bases and a domain level term synonym table;

one or more work packages provided within each of the one or more domains, wherein each of the one or more work packages defines a particular organization structure for effecting an evaluation, wherein each of the one or more work packages comprises:

a text extractor for evaluating narrative text, for extracting verbatim terms from the narrative text and for assigning a label to each of the verbatim terms;

a classifier for evaluating each of the verbatim terms extracted by the text extractor and deriving preferred matching and classification terms based upon one of the one or more knowledge bases or the domain level term synonym table; and a reviewer for reviewing the classification of verbatim terms that have been classified by the classifier, for reviewing the verbatim terms extracted by the text extractor and for making corrections, wherein the enterprise includes an enterprise agent for storing the received textual data in an appropriate table based on a particular work package associated with the textual data and for later sending the received textual data to the particular work package.

26. The system according to claim 25, further comprising an authorized director for creating and maintaining each of the one or more domains.

27. The system according to claim 25, further comprising an authorized administrator for creating and maintaining each of the one or more work packages.

28. The system according to claim 25, further comprising an authorized work manager for managing each of the one or more work packages.

29. The system according to claim 25, wherein the enterprise agent sends the received textual data to the particular work package via an Open Database Connectivity connection.

30. A system for permitting structured vocabulary searches, the system comprising:

an enterprise having a single point of control for all system wide decisions and controls, wherein the enterprise includes an enterprise level database for receiving textual data that contains terms to be classified;

one or more domains that are each related to a particular scientific or technological area, wherein the one or more domains are provided within the enterprises and each of the one or more domains includes one or more knowledge bases and a domain level term synonym table;

one or more work packages provided within each of the one or more domains, wherein each of the one or more work packages defines a particular organization structure for effecting an evaluation, wherein each of the one or more work packages comprises:

a text extractor for evaluating narrative text, for extracting verbatim terms from the narrative text and for assigning a label to each of the verbatim terms;

a classifier for evaluating each of the verbatim terms extracted by the text extractor and deriving preferred matching and classification terms based upon one of the one or more knowledge bases or the domain level term synonym table; and a reviewer for reviewing the classification of verbatim terms that have been classified by the classifier, for reviewing the verbatim terms extracted by the text extractor and for making corrections, wherein the enterprise includes an enterprise agent for storing the received textual data in an appropriate table based on a particular work package associated with the textual data and for later sending the received textual data to the particular work package, wherein:

a text extractor identification is recorded to permit audit of decisions made by the text extractor;

a classifier identification is recorded to permit audit of decisions made by the classifier; and a reviewer identification is recorded to permit audit of decisions made by the reviewer.

31. A method for searching and classifying structured vocabulary, the method comprising:

extracting received input data to obtain verbatim terms, wherein the extracting of the received input data includes:

formatting the input data into a work table of terms;

comparing the work table of terms with previous input terms and customer term synonym lists; and defining terms in the work table of terms that are identifiable with the previous input terms or the synonym lists as the verbatim terms;

manually reviewing the verbatim terms to eliminate duplicate verbatim terms;

comparing the verbatim terms to concepts related to scientific or technological areas to determine if the verbatim terms are associated with any of the specific scientific or technological areas and accordingly classifying the verbatim terms in one or more of the scientific or technological areas if such an association is determined;

manually reviewing the classified verbatim terms; and generating a result output that includes the classified verbatim terms, wherein the result output is in a format appropriate for storage in a customer database.

32. The method of claim 31, wherein extracting of the received input data is performed by a matching algorithm that utilizes lexical characteristics augmented with knowledge of a specific area of science or technology.

* * * * *